(12) United States Patent
Wang et al.

(10) Patent No.: US 12,143,146 B2
(45) Date of Patent: Nov. 12, 2024

(54) ECHO CANCELLATION METHOD AND TRANSCEIVER

(71) Applicant: HUAWEI TECHNOLOGIES CO., LTD., Shenzhen (CN)

(72) Inventors: Jinshan Wang, Dongguan (CN); Liming Fang, Shenzhen (CN); Yanbo Zhao, Shenzhen (CN); Yanbin Sun, Wuhan (CN); Jianfei Liu, Wuhan (CN); Yumeng Yang, Dongguan (CN); Chao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 57 days.

(21) Appl. No.: 17/987,393

(22) Filed: Nov. 15, 2022

(65) Prior Publication Data

US 2023/0072440 A1    Mar. 9, 2023

Related U.S. Application Data

(63) Continuation of application No. PCT/CN2021/092238, filed on May 7, 2021.

(30) Foreign Application Priority Data

May 15, 2020   (CN) .......................... 202010414992.8

(51) Int. Cl.
*H04B 1/525*   (2015.01)
*H04B 1/10*    (2006.01)
*H04B 7/015*   (2006.01)

(52) U.S. Cl.
CPC .............. *H04B 1/525* (2013.01); *H04B 1/10* (2013.01); *H04B 7/015* (2013.01)

(58) Field of Classification Search
CPC ........... H04B 1/525; H04B 1/10; H04B 7/015
See application file for complete search history.

(56) References Cited

U.S. PATENT DOCUMENTS

| | | | | |
|---|---|---|---|---|
| 8,165,188 B2* | 4/2012 | Shih | ...................... | H03L 7/0812 |
| | | | | 375/219 |
| 8,284,878 B2* | 10/2012 | Shih | .......................... | H04B 3/23 |
| | | | | 375/348 |
| 8,406,336 B2* | 3/2013 | Huang | ...................... | H04B 3/32 |
| | | | | 379/406.01 |
| 8,588,404 B2* | 11/2013 | Czyzewski | ............ | H04B 3/234 |
| | | | | 379/406.14 |
| 2018/0048396 A1* | 2/2018 | Takatori | ............... | H03G 3/3042 |

FOREIGN PATENT DOCUMENTS

WO    2004098088 A2    11/2004

OTHER PUBLICATIONS

Chinese Office Action issued in corresponding Chinese Application No. 202010414992.8, dated Mar. 24, 2022, pp. 1-10.

* cited by examiner

*Primary Examiner* — Sophia Vlahos
(74) *Attorney, Agent, or Firm* — HAUPTMAN HAM, LLP

(57) ABSTRACT

An echo cancellation method and a transceiver to reduce dependence of a system on an enob of a DAC, and improve performance of echo cancellation. The transceiver includes an echo cancellation apparatus, a transmit link, a receive link, and a hybrid circuit. The transmit link and the receive link are coupled to a transmission line by using the hybrid circuit. The echo cancellation apparatus includes a first signal converter, a slicer, a first subtractor, a second digital-to-analog converter, a second subtractor, and a third subtractor.

20 Claims, 5 Drawing Sheets

ECHO CANCELLATION METHOD AND TRANSCEIVER

CROSS-REFERENCE TO RELATED APPLICATIONS

This application is a continuation of International Application No. PCT/CN2021/092238, filed on May 7, 2021, which claims priority to Chinese Patent Application No. 202010414992.8, filed on May 15, 2020. The disclosures of the aforementioned applications are hereby incorporated in entirety by reference.

BACKGROUND

A full-duplex technology is used in a high-speed in-vehicle ethernet standard (such as 802.3ch) to transmit data. In a high-speed full-duplex transmission system, an echo signal is a main factor that interferes with a receive signal. There are usually two paths for the echo signal: One is leakage of a hybrid (hybrid) circuit (for example, a transmit signal leaked from the hybrid circuit to a receive link), and the hybrid circuit (or a directional coupler) prevents leakage of the transmit signal from a transmit link to the receive link. However, in response to isolation of the hybrid circuit being insufficient, a transmit signal leaked to the receive link is still strong. The other is reflection of a signal transmit/receive channel (for example, a transmit signal reflected by a single twisted pair in response to a receive signal and a transmit signal being transmitted by using the single twisted pair). Currently, a digital echo canceller and an analog echo canceller (digital echo canceller+analog echo canceller, DEC+AEC for short) are used to cancel an echo signal; in other words, a combination of a DEC and an AEC is used to cancel the echo signal. The essence of echo cancellation is to train a filter to reconstruct a digital echo signal or an analog echo signal and then subtract the echo signal from a receive signal to achieve echo cancellation. The DEC is usually used in response to the echo signal being less than strong. In response to the echo signal is extremely strong, a level of a total receive signal is to be reduced to avoid saturation of an analog-to-digital converter (ADC) on a receive link. This generally calls for the AEC to implement echo cancellation of an echo signal in an analog domain. A principle of echo cancellation of the echo signal in the analog domain is to add an additional digital-to-analog converter (DAC) to reconstruct the echo signal in the analog domain, so that the echo signal is eliminated before the receive signal is fed to the ADC.

Currently, two modulation schemes: pulse amplitude modulation 4 (PAM 4) and PAM 8 is used in a 25 Gbps in-vehicle ethernet. The PAM 4 modulation scheme is used as an example. To achieve a net rate of 25 Gbps, channel bandwidth of 7.03 GHz is called for, bandwidth supported by an ADC on a transmit link or a DAC on a receive link further is to be greater than 7.03 GHz, and a sampling rate further is to be greater than at least 14.06 GHz. An effective number of bits (ENOB) of the DAC/ADC with such a high sampling rate is approximately 6.0. Consequently, a DAC/ADC component has high quantization noise, and extremely high quantization noise leads to a decrease in an SNR of a system and degradation of performance. The conventional DEC+AEC solution calls for that an enob of the DAC used for echo cancellation of the echo signal in the analog domain be greater than an enob of the DAC on the transmit link to make analog cancellation to have a gain. Implementation of a DAC with high bandwidth (effective bandwidth>7 GHz) and higher resolution (Enob>6.0) is challenging and expensive. Performance of a conventional AEC scheme is limited by the enob (or resolution) of the DAC used for echo cancellation. Because the enob of the DAC used for echo cancellation is low, although the AEC avoids saturation of the ADC on the receive link, the high quantization noise introduced by the DAC used for echo cancellation cannot be offset. This still greatly reduces a signal to noise ratio (SNR) of the system and reduces performance of the system.

SUMMARY

Some embodiments provide an echo cancellation method and a transceiver, so that dependence of a system on an enob of a DAC is reduced, and performance of echo cancellation is improved.

In some embodiments, a transceiver is provided. The transceiver includes an echo cancellation apparatus, a transmit link, a receive link, and a hybrid circuit. The transmit link and the receive link are coupled to a transmission line by using the hybrid circuit. The echo cancellation apparatus includes a first signal converter, a slicer, a first subtractor, a second digital-to-analog converter, a second subtractor, and a third subtractor. The first signal converter is configured to generate an echo reference signal based on a digital transmit signal on the transmit link. The slicer is configured to obtain a first cancellation reference signal whose amplitude is greater than a first threshold from the echo reference signal. The first subtractor is configured to subtract the first cancellation reference signal from the echo reference signal to obtain a second cancellation reference signal. The second digital-to-analog converter is configured to perform digital-to-analog conversion on the first cancellation reference signal to generate a first echo cancellation signal. The second subtractor is configured to subtract the first echo cancellation signal from an analog receive signal received by the receive link. The third subtractor is configured to subtract the second cancellation reference signal from a digital receive signal on the receive link. In the foregoing solution, the slicer obtains, based on the first threshold, a sample, namely, the first echo cancellation signal, whose amplitude is greater than the first threshold from the echo reference signal generated by the first signal converter, and then the first subtractor subtracts the first cancellation reference signal from the echo reference signal to generate the second cancellation reference signal, to divide the echo reference signal into two parts. The second digital-to-analog converter performs digital-to-analog conversion on the first cancellation reference signal to generate the first echo cancellation signal, and the second subtractor eliminates the first echo cancellation signal from the analog receive signal received by the receive link, so that one part of the echo reference signal is cancelled in an analog domain. Because a sample with a high amplitude is removed from the analog receive signal, saturation of an analog-to-digital converter on the receive link is avoided, and a hardware demand on the analog-to-digital converter is reduced. For the remaining second cancellation reference signal, the third subtractor subtracts the second cancellation reference signal from the digital receive signal, so that the other part of the echo reference signal is cancelled in a digital domain. Because the slicer and the first subtractor divide the echo reference signal into two parts, the second digital-to-analog converter does not process signals on bandwidth of the echo reference signal, and therefore, a demand for an enob of the second digital-to-analog converter is reduced.

In some embodiments, the transceiver further includes: a second signal converter, configured to process the second cancellation reference signal based on noise introduced in response to the second digital-to-analog converter performing digital-to-analog conversion on the first cancellation reference signal to generate the first echo cancellation signal and/or noise introduced in response to the receive link converting the analog receive signal into the digital receive signal. Noise is introduced in response to the second digital-to-analog converter performing digital-to-analog conversion on the first cancellation reference signal to generate the first echo cancellation signal, and noise is introduced in response to the receive link performing analog-to-digital conversion on the analog receive signal from which the first echo cancellation signal is subtracted, to generate the digital receive signal. Therefore, in this design, after the receive link performs analog-to-digital conversion on the analog receive signal from which the first echo cancellation signal is subtracted, to generate the digital receive signal, the second cancellation reference signal and an echo signal in the digital domain that remains in the digital receive signal are aligned, so that the noise introduced by the second digital-to-analog converter and the noise introduced by the analog-to-digital converter on the receive link are eliminated, and therefore performance of echo cancellation is ensured. The second signal converter is to participate in cancellation of some echo reference signals in the digital domain, and as described above, the second signal converter is to process the second cancellation reference signal whose amplitude is less than or equal to the first threshold (that is, with a small amplitude). Therefore, complexity of the second signal converter is reduced. For example, in response to a digital filter being used as the second signal converter, a smaller quantity of taps are called for than that in a conventional technology.

In some embodiments, the first signal converter includes a first digital filter. Before the foregoing solution is performed, a coefficient of the first digital filter is to be trained first. The echo cancellation apparatus further includes a training unit, configured to train a first predetermined digital filter model by using the digital receive signal, to obtain the coefficient of the first digital filter. The digital receive signal includes a leaked signal obtained after an analog transmit signal on the transmit link is leaked in the hybrid circuit to the receive link and a reflected signal obtained after the analog transmit signal is reflected on the transmission line to the receive link. The training unit is configured to train the first predetermined digital filter model by using the digital receive signal and a least mean square LMS algorithm.

In some embodiments, the second signal converter includes a second digital filter. Before the foregoing solution is performed, a coefficient of the second digital filter is to be trained first. The slicer is further configured to obtain, from the digital transmit signal, a first training digital signal whose amplitude is greater than the first threshold. The second digital-to-analog converter is further configured to convert the first training digital signal into a training analog signal. The analog-to-digital converter on the receive link is configured to convert the training analog signal into a second training digital signal. The transceiver further includes a training unit, and the training unit is configured to train a second predetermined digital filter model by using the second training digital signal to obtain the coefficient of the second digital filter. The training unit is configured to train the second predetermined digital filter model by using the second training digital signal and an LMS algorithm.

In some embodiments, the transmission line includes a single twisted pair.

In some embodiments, to reduce excessively high noise introduced by the second digital-to-analog converter, a 1-bit digital-to-analog converter is used as the second digital-to-analog converter, and an amplitude of the first echo cancellation signal is a voltage amplitude threshold of the second digital-to-analog converter. In this way, the second digital-to-analog converter is equivalent to a high-precision reference power source, and output of the second digital-to-analog converter is a positive reference voltage or a negative reference voltage, and an absolute value of the positive reference voltage or the negative reference voltage is the voltage amplitude threshold. In this way, noise introduced by the second digital-to-analog converter is voltage noise, and is ignored.

In some embodiments, an echo cancellation method is provided and is applied to a transceiver. The transceiver includes an echo cancellation apparatus, a transmit link, a receive link, and a hybrid circuit, and the transmit link and the receive link are coupled to a transmission line by using the hybrid circuit. The echo cancellation method includes: generating an echo reference signal based on a digital transmit signal on the transmit link; obtaining a first cancellation reference signal whose amplitude is greater than a first threshold from the echo reference signal; subtracting the first cancellation reference signal from the echo reference signal to obtain a second cancellation reference signal; performing digital-to-analog conversion on the first cancellation reference signal to generate a first echo cancellation signal; subtracting the first echo cancellation signal from an analog receive signal received by the receive link; and subtracting the second cancellation reference signal from a digital receive signal on the receive link.

In some embodiments, before the subtracting the second cancellation reference signal from a digital receive signal on the receive link, the method further includes: processing the second cancellation reference signal based on noise introduced in response to digital-to-analog conversion being performed on the first cancellation reference signal to generate the first echo cancellation signal and/or noise introduced in response to the receive link converting the analog receive signal into the digital receive signal.

In some embodiments, the method further includes: training a first predetermined digital filter model by using the digital receive signal, to obtain a coefficient of a first digital filter. The first digital filter is configured to generate the echo reference signal based on the digital transmit signal on the transmit link. The digital receive signal includes a leaked signal obtained after an analog transmit signal on the transmit link is leaked in the hybrid circuit to the receive link and a reflected signal obtained after the analog transmit signal is reflected on the transmission line to the receive link. The training a first predetermined digital filter model by using the digital receive signal includes: training the first predetermined digital filter model by using the digital receive signal and a least mean square LMS algorithm.

In some embodiments, the method further includes: obtaining, from the digital transmit signal, a first training digital signal whose amplitude is greater than the first threshold; converting the first training digital signal into a training analog signal; converting the training analog signal into a second training digital signal; and training a second predetermined digital filter model by using the second training digital signal, to obtain a coefficient of a second digital filter, where the second digital filter is configured to process the second cancellation reference signal. The training a second predetermined digital filter model by using the second training digital signal includes: training the second predetermined digital filter model by using the second training digital signal and an LMS algorithm.

For technical effects brought by any design manner, refer to technical effects brought by different design manners. Details are not described herein again.

DESCRIPTION OF EMBODIMENTS

In some embodiments, "at least one" means one or more, and "a plurality of" means two or more. "And/or" describes an association relationship between associated objects, and represents that three relationships exists. For example, A and/or B represents the following cases: A exists, both A and B exist, and B exists, where A and B is singular or plural. "At least one of the following items (pieces)" or a similar expression thereof indicates any combination of these items, including a single item (piece) or any combination of a plurality of items (pieces). For example, at least one of a, b, or c indicates: a, b, c, a and b, a and c, b and c, or a, b, and c, where a, b, and c is singular or plural. In addition, in some embodiments, words such as "first" and "second" are used to distinguish objects whose names, functions, or effects are similar. A person skilled in the art understands that the words such as "first" and "second" are not intended to limit a quantity and an execution sequence.

Figure 1:
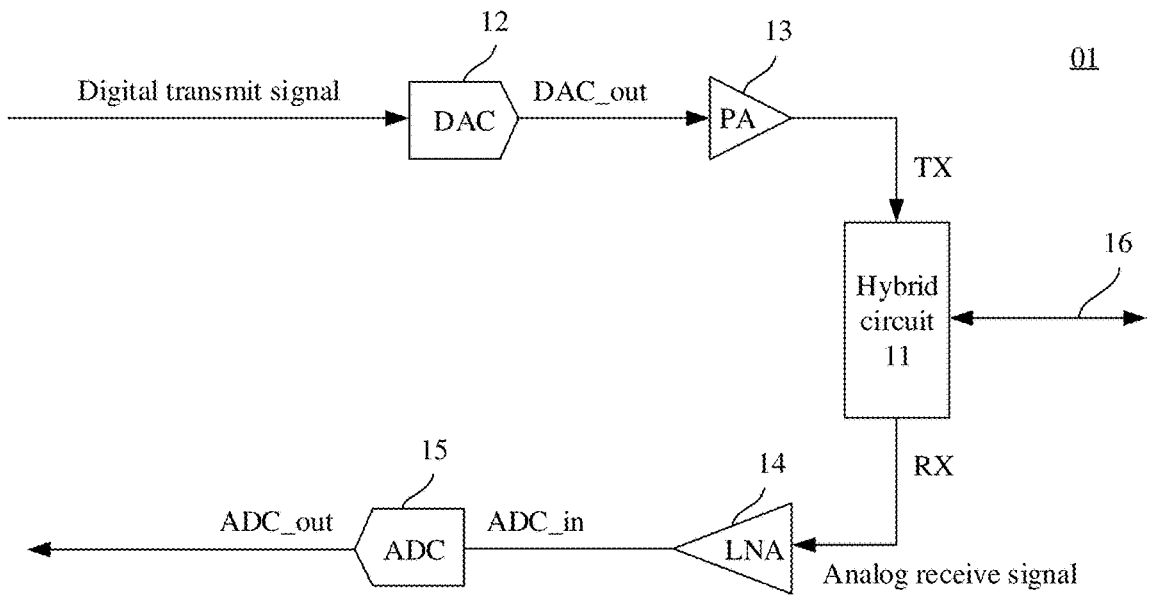
FIG. 1 is a schematic diagram of a structure of a transceiver in accordance with some embodiments.

A full-duplex technology is used in a high-speed in-vehicle ethernet standard (such as 802.3ch) to transmit data. In a high-speed full-duplex transmission system, a transceiver is used to send a digital transmit signal Tx_signal, and receives an analog receive signal Rx_signal. As shown in FIG. 1, a schematic diagram of a structure of a transceiver 01 is provided. The transceiver 01 includes a transmit link Tx and a receive link Rx, and the receive link Rx and the transmit link Tx are coupled to a hybrid circuit 11. As shown in FIG. 1, the transmit link Tx includes a first digital-to-analog converter (DAC) 12 and a power amplifier (PA) 13 coupled to the first digital-to-analog converter 12; the receive link Rx includes a low noise amplifier (LNA) 14 and an analog-to-digital converter (ADC) 15 coupled to the low noise amplifier 14; and the power amplifier 13 is coupled to the hybrid circuit 11, and the low-noise amplifier 14 is coupled to the hybrid circuit 11. The first digital-to-analog converter 12 is configured to: perform digital-to-analog conversion on a digital transmit signal Tx_signal to generate an analog transmit signal, and send the analog transmit signal to the power amplifier 13 through an output end DAC_out. The power amplifier 13 is configured to: perform power amplification on the analog transmit signal, and send the analog transmit signal to a transmission line 16 by using the hybrid circuit 11. For example, the transmission line 16 is a single twisted pair. The low-noise amplifier 14 is configured to amplify an analog receive signal Rx_signal received by the hybrid circuit 11 from the transmission line and input the analog receive signal Rx_signal to an input end ADC_in of the analog-to-digital converter 15. The analog-to-digital converter 15 is configured to perform analog-to-digital conversion on the analog receive signal Rx_signal to generate a digital receive signal and output the digital receive signal from an output end ADC_out.

For the foregoing transceiver, an echo signal is a main factor that interferes with a receive signal. There are usually two paths for the echo signal: One is leakage of a hybrid circuit (for example, a transmit signal leaked from the hybrid circuit to a receive link), and the hybrid circuit (or a directional coupler) prevents leakage of the transmit signal from a transmit link to the receive link. However, in response to isolation of the hybrid circuit being insufficient, a transmit signal leaked to the receive link is still very strong. The other is reflection of a signal transmit/receive channel (for example, a transmit signal reflected by a single twisted pair in response to a receive signal and a transmit signal being transmitted by using the single twisted pair).

Figure 2:
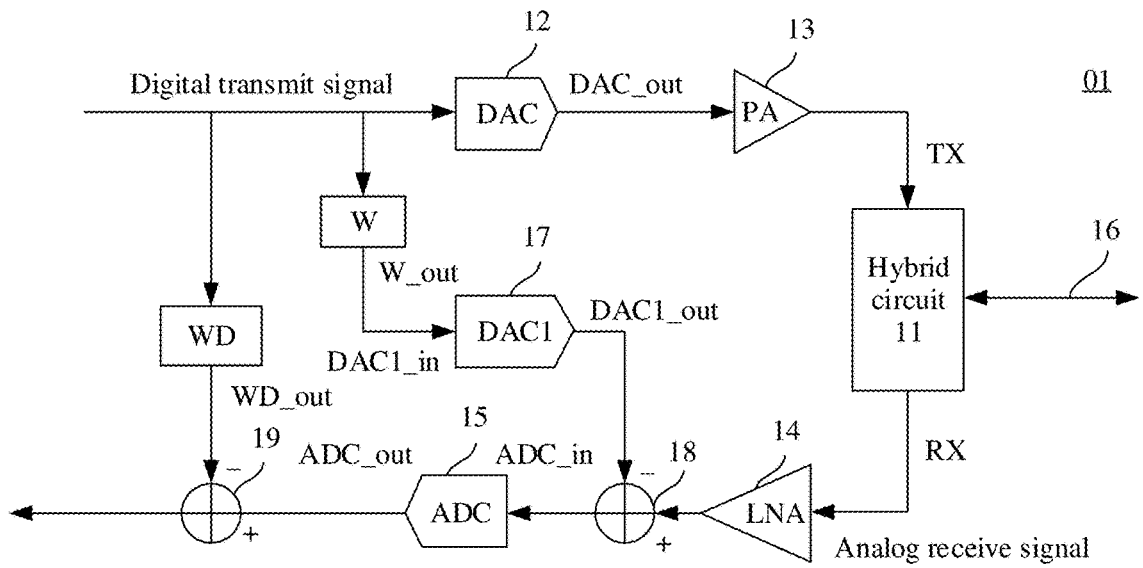
FIG. 2 is a schematic diagram of a structure of a transceiver in accordance with some embodiments.

Currently, a digital echo canceller and an analog echo canceller (echo canceller) are generally used to cancel an echo signal; in other words, a combination of a DEC and an AEC is used to cancel the echo signal. The essence of echo cancellation is to train a filter to reconstruct a digital echo signal or an analog echo signal and then subtract the echo signal from a receive signal to achieve echo cancellation. The DEC is usually used in response to the echo signal being not strong. In response to the echo signal is extremely strong, a level of a total receive signal is to be reduced to avoid saturation of an analog-to-digital converter (ADC) on a receive link. This generally calls for the AEC to implement echo cancellation of an echo signal in an analog domain. A principle of echo cancellation of the echo signal in the analog domain is to add an additional digital-to-analog converter (DAC) to reconstruct the echo signal in the analog domain, so that the echo signal is eliminated before the receive signal is fed to the ADC. As shown in FIG. 2, the transceiver 01 further includes a first digital filter W and a second digital filter WD. The first digital filter W is configured to cancel an echo signal in an analog domain, and the second digital filter WD is configured to cancel an echo signal in a digital domain. An output end W_out of the first digital filter W is coupled to an input end DAC1_in of a second digital-to-analog converter (DAC 1) 17, an output end DAC1_out of the second digital-to-analog converter 17 is coupled to a second subtractor 18 disposed between the low-noise amplifier 14 and the analog-to-digital converter (ADC) 15, and an output end of the second subtractor 18 is coupled to an input end ADC_in of the analog-to-digital converter (ADC) 15. The filter W is configured to: generate a digital echo signal based on the Tx_signal, convert the digital echo signal into an analog echo signal by using the second digital-to-analog converter 17, and finally eliminate, by using the second subtractor 18, the analog echo signal from the Rx_signal amplified by the LNA (where the analog echo signal is input from a negative input end (−) of the second subtractor 18, and the Rx_signal amplified by the LNA is input from a positive input end (+) of the second subtractor 18). An output end WD_out of the second filter WD is coupled to a negative input end (−) of a third subtractor 19, a positive input end (+) of the third subtractor 19 is coupled to an output end ADC_out of the analog-to-digital converter 15, and the second digital filter WD is configured to: generate a digital echo signal based on the Tx_signal, and eliminate, by using the third subtractor 19, the digital echo signal from a digital receive signal obtained by the analog-to-digital converter (ADC). In a normal data communication mode, a transceiver at a local end and a transceiver at a peer end work at the same time, that is, send signals at the same time. A receive link of the transceiver at the local end receives a signal (that is, an ideal receive signal) that is attenuated on the transmission line from the transceiver at the peer end, an echo signal obtained after an analog transmit signal sent by the transceiver at the local end is leaked in the hybrid circuit, and an echo signal returned on the transmission line. Therefore, the Rx_signal includes three parts, that is, Rx_signal=expected received signal+hybrid echo signal+return loss signal, where the expected received signal is expected received ideal signal without any echo, the hybrid echo signal is an echo signal generated due to leakage in the hybrid circuit, and the return loss signal is the echo signal returned on the transmission line. A main purpose of the DEC and the AEC is to subtract the hybrid echo signal and the return loss signal from the Rx_signal to implement echo cancellation.

Currently, two modulation schemes: PAM 4 and PAM 8 is used in a 25 Gbps in-vehicle ethernet. The PAM 4 modulation scheme is used as an example. To achieve a net rate of 25 Gbps, channel bandwidth of 7.03 GHz is called for, bandwidth supported by an ADC on a transmit link or a DAC on a receive link further is to be greater than 7.03 GHz, and a sampling rate further is to be greater than at least 14.06 GHz. An effective number of bits (enob) of the DAC/ADC with such a high sampling rate is approximately 6.0. Consequently, a DAC/ADC component has high quantization noise, and extremely high quantization noise leads to a decrease in an SNR of a system and degradation of performance. The conventional DEC+AEC solution calls for that an enob of the DAC used for echo cancellation of the echo signal in the analog domain be greater than an enob of the DAC on the transmit link to make analog cancellation to have a gain. Implementation of a DAC with high bandwidth (effective bandwidth>7 GHz) and higher resolution (Enob>6.0) is challenging and expensive. Performance of a conventional AEC scheme is limited by the enob (or resolution) of the DAC used for echo cancellation. Because the enob of the DAC used for echo cancellation is low, although the AEC avoids saturation of the ADC on the receive link, the high quantization noise introduced by the DAC used for echo cancellation cannot be offset. This still greatly reduces a signal to noise ratio (SNR) of the system and reduces performance of the system.

Figure 3:
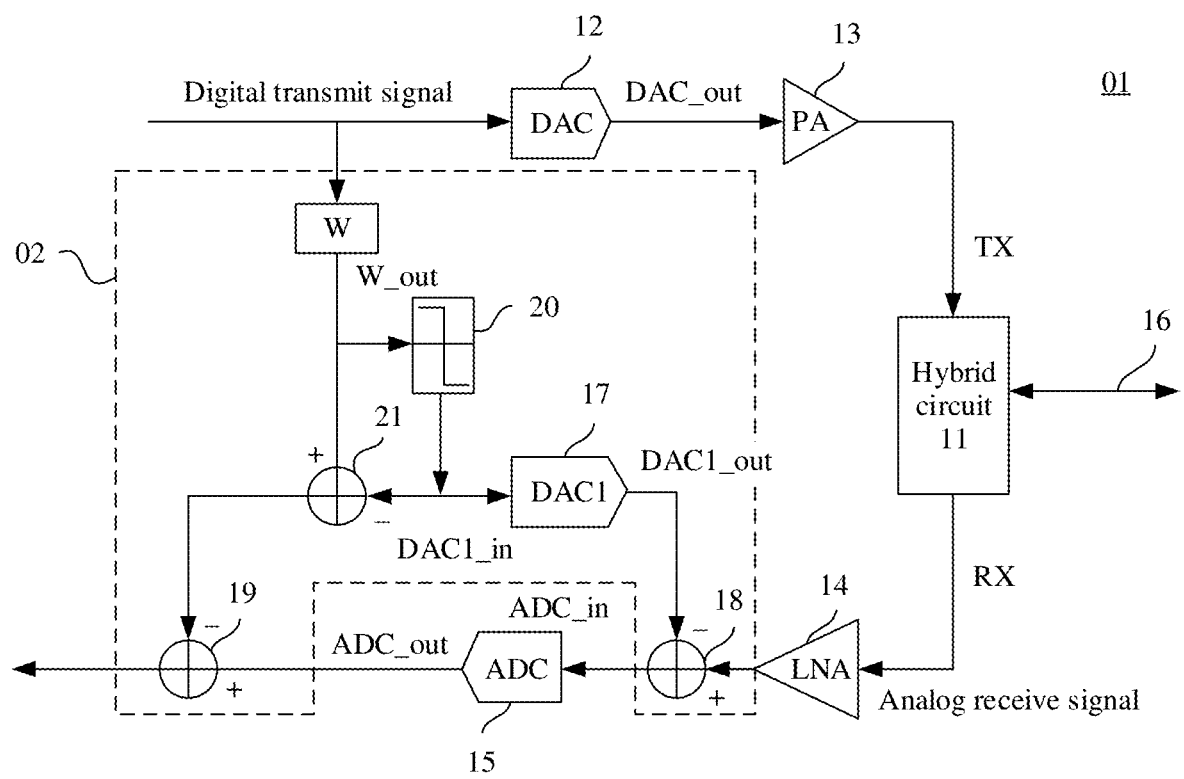
FIG. 3 is a schematic diagram of a structure of a transceiver in accordance with some embodiments.

To resolve the foregoing problem, some embodiments provide a transceiver 01. As shown in FIG. 3, the transceiver includes an echo cancellation apparatus 02, a transmit link TX, a receive link RX, and a hybrid circuit 11. The transmit link TX and the receive link RX are coupled to a transmission line 16 by using the hybrid circuit 11. The receive link Rx includes a low noise amplifier 14 and an analog-to-digital converter 15 coupled to the low noise amplifier 14. A power amplifier 13 is coupled to the hybrid circuit 11, and the low-noise amplifier 14 is coupled to the hybrid circuit 11. A first digital-to-analog converter 12 is configured to perform digital-to-analog conversion on a digital transmit signal Tx_signal to generate an analog transmit signal. The power amplifier 13 is configured to: perform power amplification on the analog transmit signal, and send the analog transmit signal to the transmission line 16 by using the hybrid circuit 11. The low-noise amplifier 14 is configured to amplify an analog receive signal received by the hybrid circuit 11 from the transmission line 16, and the analog-to-digital converter 15 is configured to perform analog-to-digital conversion on the analog receive signal to generate a digital receive signal.

The echo cancellation apparatus 02 includes a first signal converter W, a slicer 20, a first subtractor 21, a second digital-to-analog converter 17, a second subtractor 18, and a third subtractor 19.

Functions and connection relationships of the components in the echo cancellation apparatus 20 are described as follows:

The first signal converter W is configured to generate an echo reference signal based on a digital transmit signal Tx_signal on the transmit link Tx. The first signal converter W is configured to simulate an echo signal of an echo channel based on the digital transmit signal Tx_signal to generate the echo reference signal, and the echo channel includes: the transmit link Tx, the hybrid circuit 11, and the receive link Rx, where the transmit link Tx includes the first digital-to-analog converter (DAC) 12 and the power amplifier 13 coupled to the first digital-to-analog converter 12. Certainly, a process in which the first signal converter W generates the echo reference signal based on the digital transmit signal Tx_signal on the transmit link Tx includes but is not limited to: performing digital domain processing such as filtering or sampling on the digital transmit signal Tx_signal.

The slicer 20 is configured to obtain a first cancellation reference signal whose amplitude is greater than a first threshold from the echo reference signal.

The first subtractor 21 is configured to subtract the first cancellation reference signal from the echo reference signal to obtain a second cancellation reference signal. For example, the slicer 20 is coupled to a negative input end (−) of the first subtractor, and an output end W_out of the first digital filter W is coupled to a positive input end (+) of the first subtractor.

The second digital-to-analog converter 17 is configured to perform digital-to-analog conversion on the first cancellation reference signal to generate a first echo cancellation signal. An input end DAC1_in of the second digital-to-analog converter is coupled to the slicer 20 and the negative input end (−) of the first subtractor.

The second subtractor 18 is configured to subtract the first echo cancellation signal from an analog receive signal received by the receive link. An output end DAC1_out of the second digital-to-analog converter is coupled to a negative input end (−) of the second subtractor 18, a positive input end (+) of the second subtractor 18 is coupled to an LNA, and an Rx_signal amplified by the LNA is input from the positive input end (+) of the second subtractor 18.

The third subtractor 19 is configured to subtract the second cancellation reference signal from a digital receive signal on the receive link. The first subtractor 21, the second subtractor 18, and the third subtractor 19 is filters, and is further referred to as subtraction filters in some solutions.

In the foregoing solution, the slicer obtains, based on the first threshold, a sample, namely, the first echo cancellation signal, whose amplitude is greater than the first threshold from the echo reference signal generated by the first signal converter, and then the first subtractor subtracts the first cancellation reference signal from the echo reference signal to generate the second cancellation reference signal, to divide the echo reference signal into two parts. The second digital-to-analog converter performs digital-to-analog conversion on the first cancellation reference signal to generate the first echo cancellation signal, and the second subtractor eliminates the first echo cancellation signal from the analog receive signal received by the receive link, so that one part of the echo reference signal is cancelled in an analog domain. Because a sample with a high amplitude is removed from the analog receive signal, saturation of an analog-to-digital converter on the receive link is avoided, and a hardware demand on the analog-to-digital converter is reduced. For the remaining second cancellation reference signal, the third subtractor subtracts the second cancellation reference signal from the digital receive signal, so that the other part of the echo reference signal is cancelled in a digital domain. Because the slicer and the first subtractor divide the echo reference signal into two parts, the second digital-to-analog converter does not process signals on bandwidth of the echo reference signal, and therefore, a demand for an enob of the second digital-to-analog converter is reduced.

Figure 4:
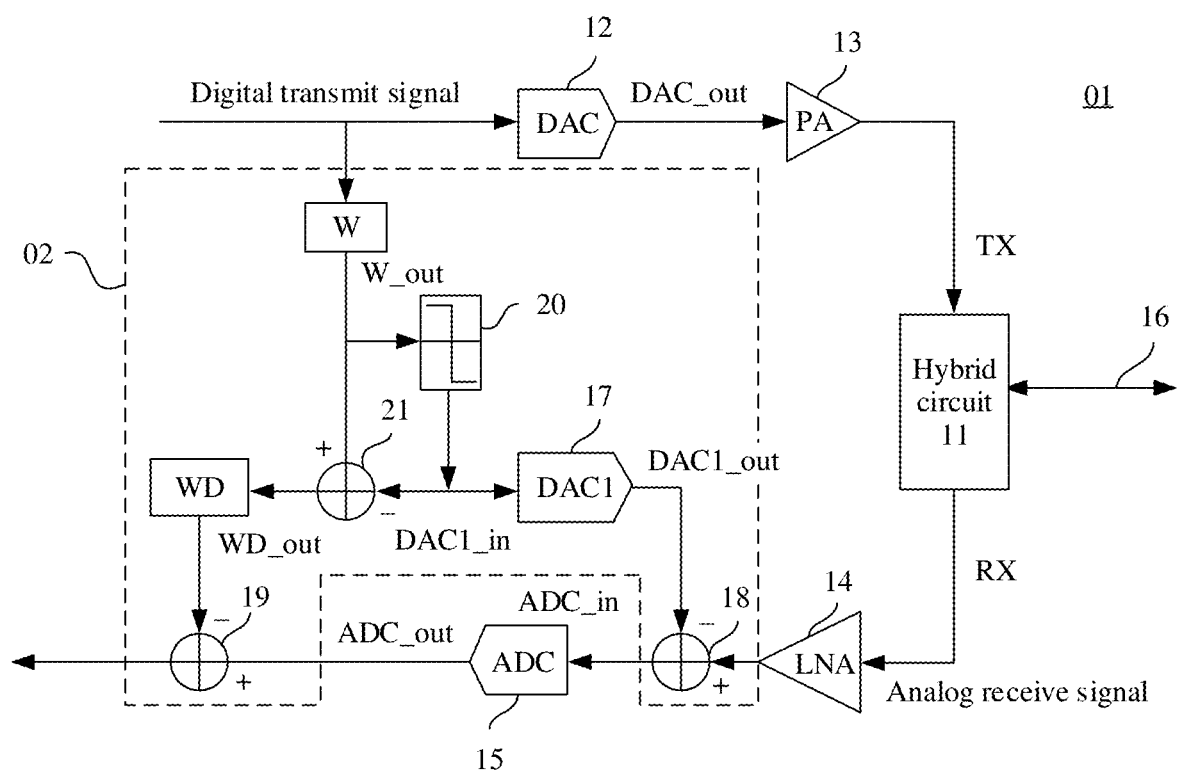
FIG. 4 is a schematic diagram of a structure of a transceiver in accordance with some embodiments.

For example, as shown in FIG. 4, the echo cancellation apparatus 02 further includes a second signal converter WD. The second signal converter WD is configured to process the second cancellation reference signal based on noise introduced in response to the second digital-to-analog converter performing digital-to-analog conversion on the first cancellation reference signal to generate the first echo cancellation signal and/or noise introduced in response to the receive link converting the analog receive signal into the digital receive signal.

Noise is introduced in response to the second digital-to-analog converter performing digital-to-analog conversion on the first cancellation reference signal to generate the first echo cancellation signal, and noise is introduced in response to the receive link performing analog-to-digital conversion on the analog receive signal from which the first echo cancellation signal is subtracted, to generate the digital receive signal. Therefore, in this design, after the receive link performs analog-to-digital conversion on the analog receive signal from which the first echo cancellation signal is subtracted, to generate the digital receive signal, the second cancellation reference signal and an echo signal in the digital domain that remains in the digital receive signal are aligned, so that the noise introduced by the second digital-to-analog converter and the noise introduced by the analog-to-digital converter on the receive link are eliminated, and therefore performance of echo cancellation is ensured. The second signal converter is to participate in cancellation of some echo reference signals in the digital domain, and as described above, the second signal converter is to process the second cancellation reference signal whose amplitude is less than or equal to the first threshold (that is, with a small amplitude). Therefore, complexity of the second signal converter is reduced. For example, in response to a digital filter being used as the second signal converter, a smaller quantity of taps are called for than that in a conventional technology.

Further, to reduce excessively high noise introduced by the second digital-to-analog converter 17, a 1-bit digital-to-analog converter is used as the second digital-to-analog converter 17. The second digital-to-analog converter 17 is equivalent to a high-precision reference power source, output of the second digital-to-analog converter 17 is a positive reference voltage or a negative reference voltage, and an absolute value of the positive reference voltage or the negative reference voltage is a voltage amplitude threshold 1. In this way, noise introduced by the second digital-to-analog converter 17 is voltage noise, and is ignored. In response to a 1-bit digital-to-analog converter being used as the second digital-to-analog converter 17, a signal update criterion of DAC1_in and ADC_in is as follows:

if (abs(W_out (i))>threshold)\\*If an absolute value of a sample i output by W_out is greater than the threshold*\\
   DAC1_in (i)=sign(W_out (i))*threshold1\\*A sample i input by DAC1_in is a symbol of the sample i output by W_out multiplied by a threshold 1*\\
else
   DAC1_in (i)=0; \\*Otherwise, the sample i input by DAC1_in is 0*\\
end $$ADC\_in =$$
$$\begin{cases} Rx\_signal - DAC1\_out; \text{ if } Rx\_signal \geq 1, DAC1\_out = \text{reference} \\ Rx\_signal; \text{ if } -1 < Rx\_signal \text{ is less than } 1 \\ Rx\_signal - DAC1\_out; \text{ if } Rx\_signal \leq -1, DAC1\_out = -\text{reference} \end{cases},$$

where
   abs( ) means to calculate an absolute value, sign( ) means to calculate a symbol, and a value of reference is the voltage amplitude threshold 1 of the second digital-to-analog converter 17.

Figure 5:
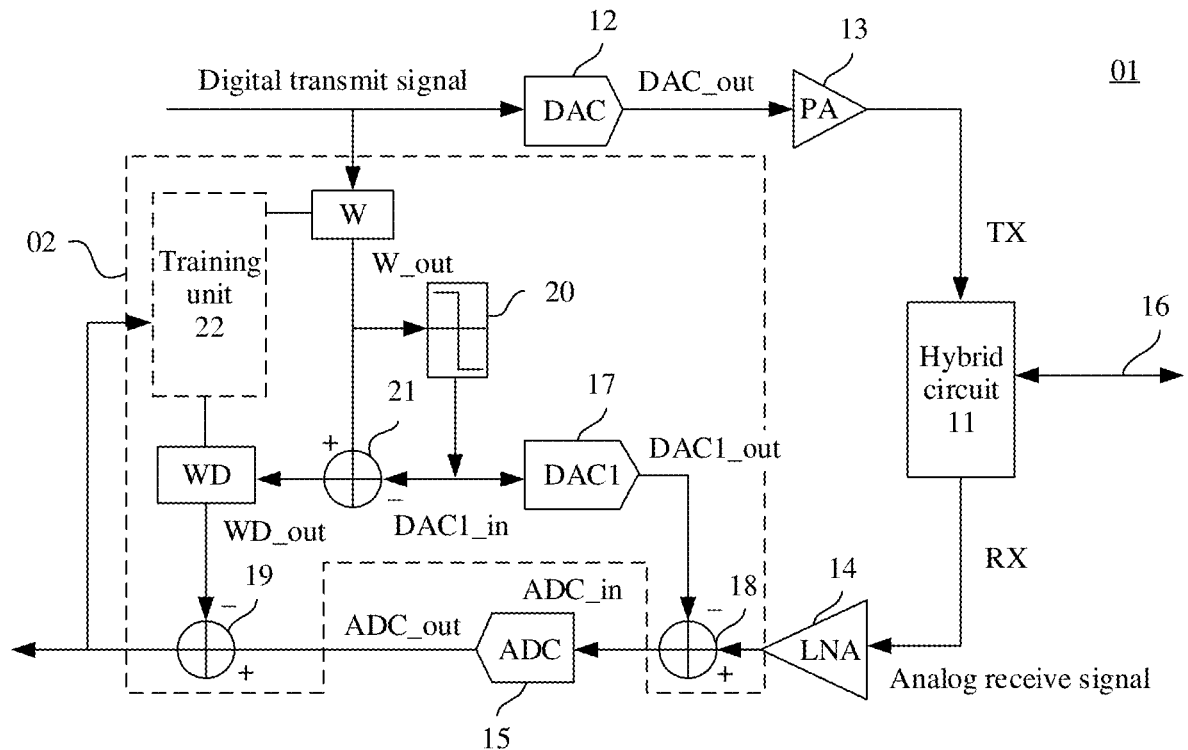
FIG. 5 is a schematic diagram of a structure of a transceiver in accordance with some embodiments.

For another example, the first signal converter includes a first digital filter, and the second signal converter includes a second digital filter. Before the foregoing solution is performed, a coefficient of the first digital filter W and a coefficient of the second digital filter WD is to be trained first, and a coefficient of a digital filter is generally a value of inverse Fourier transform that represents a digital filter transfer function. The coefficient describes characteristics of the filter and forms a basis for implementing the digital filter. A quantity of taps of the digital filter is equal to a quantity of input sampling values processed by the filter for each output point. The quantity of taps is further equal to a quantity of coefficients of the digital filter and is used to measure delay time of the digital filter. In response to training the coefficient of the first digital filter W and the coefficient of the second digital filter WD, a transceiver at a local end works, and a transceiver at a peer end keeps silent; in other words, a transmit link at the local end normally transmits a Tx_signal, and the transceiver at the peer end keeps silent, and does not transmit a signal to the transceiver at the local end. Therefore, in a process of training the coefficient of the first digital filter W, the transceiver at the local end receives, on the receive link, an echo signal generated after the Tx_signal transmitted by the transmit link at the local end passes through the hybrid circuit and the transmission line. In other words, the digital receive signal output by the output end ADC_out of the analog-to-digital converter 15 includes a leaked signal obtained after the analog transmit signal is leaked in the hybrid circuit to the receive link and a reflected signal obtained after the analog transmit signal is reflected on the transmission line to the receive link. In this case, as shown in FIG. 5, the echo cancellation apparatus 02 further includes a training unit 22, configured to train a first predetermined digital filter model by using the digital receive signal, to obtain the coefficient of the first digital filter. For example, the training unit 22 is configured to train the first predetermined digital filter model by using the digital receive signal and a least mean square (LMS) algorithm. In a process of training the coefficient of the second digital filter WD, the slicer 20 is configured to obtain a first training digital signal whose amplitude is greater than the first threshold from the digital transmit signal. The second digital-to-analog converter 17 is further configured to convert the first training digital signal obtained by the slicer 20 into a training analog signal. The analog-to-digital converter 15 is further configured to convert the training analog signal obtained by the second digital-to-analog converter through conversion into a second training digital signal. The training unit 22 is further included, and the training unit 22 is configured to train a second predetermined digital filter model by using the second training digital signal obtained by the analog-to-digital converter through conversion to obtain the coefficient of the second digital filter. A process of training the coefficient of the second digital filter WD is mainly as follows: training the coefficient of the second digital filter WD based on a signal that is output after the Tx_signal transmitted by the transmit link passes through the first digital filter W, the slicer 20, the second digital-to-analog converter 17, the second subtractor 18, and the analog-to-digital converter 15. In the training process, the coefficient of the first digital filter W is an all-zero coefficient. Therefore, the Tx_signal is directly transmitted to the slicer 20, and the slicer 20 and the second subtractor 18 generally do not introduce noise into the filter. Therefore, the process of training the coefficient of the second digital filter WD is mainly: training a response of a link including the second digital-to-analog converter 17 and the analog-to-digital converter 15, that is, noise introduced by the second digital-to-analog converter 17 and the analog-to-digital converter 15. The first predetermined digital filter model and the second predetermined digital filter model is digital filters whose quantities of taps are preset and initialized as all-zero coefficients. In the foregoing process of training the coefficient of the second digital filter WD, the 1-bit digital-to-analog converter further is configured to be used as the second digital-to-analog converter 17.

Based on the foregoing transceiver, some embodiments provide an echo cancellation method, including the following steps:

201: An echo cancellation generates an echo reference signal based on a digital transmit signal on a transmit link.

202: Obtain a first cancellation reference signal whose amplitude is greater than a first threshold from the echo reference signal.

203: Subtract the first cancellation reference signal from the echo reference signal to obtain a second cancellation reference signal.

204: Perform digital-to-analog conversion on the first cancellation reference signal to generate a first echo cancellation signal.

205: Subtract the first echo cancellation signal from an analog receive signal received by a receive link.

206: Subtract the second cancellation reference signal from a digital receive signal on the receive link.

In addition, to align the second cancellation reference signal with an echo signal in the digital receive signal on the receive link, before step 206, the method further includes: processing the second cancellation reference signal based on noise introduced in response to digital-to-analog conversion being performed on the first cancellation reference signal to generate the first echo cancellation signal and/or noise introduced in response to the receive link converting the analog receive signal into the digital receive signal.

An echo cancellation method in a normal communication mode is provided in step 201 to step 206. Before step 201 to step 206, a coefficient of a first digital filter and a coefficient of a second digital filter further is to be trained.

In response to training the coefficient of the first digital filter W and the coefficient of the second digital filter WD, a transceiver at a local end works, and a transceiver at a peer end keeps silent; in other words, a transmit link at the local end normally transmits a Tx_signal, and the transceiver at the peer end keeps silent, and does not transmit a signal to the transceiver at the local end. The transceiver at the local end receives, on the receive link, an echo signal generated after a Tx_signal transmitted by the transmit link at the local end passes through a hybrid circuit and a transmission line. In other words, a digital receive signal output by an output end ADC_out of an analog-to-digital converter 15 includes a leaked signal obtained after the analog transmit signal is leaked in the hybrid circuit to the receive link and a reflected signal obtained after the analog transmit signal is reflected on the transmission line to the receive link. A process of training the coefficient of the first digital filter W is as follows training a first predetermined digital filter model by using the digital receive signal, to obtain the coefficient of the first digital filter, where the digital receive signal includes the leaked signal obtained after the analog transmit signal is leaked in the hybrid circuit to the receive link and the reflected signal obtained after the analog transmit signal is reflected on the transmission line to the receive link. The first predetermined digital filter model is trained by using the digital receive signal and a least mean square LMS algorithm. A process of training the coefficient of the second digital filter W is as follows: obtaining, from the digital transmit signal, a first training digital signal whose amplitude is greater than the first threshold; converting the first training digital signal into a training analog signal; converting the training analog signal into a second training digital signal; and training a second predetermined digital filter model by using the second training digital signal, to obtain the coefficient of the second digital filter. The second predetermined digital filter model is trained by using the second training digital signal and an LMS algorithm.

Technical problems that is resolved and technical effects that is implemented in the method are shown in the foregoing embodiments, and details are not described again.

Figure 6:
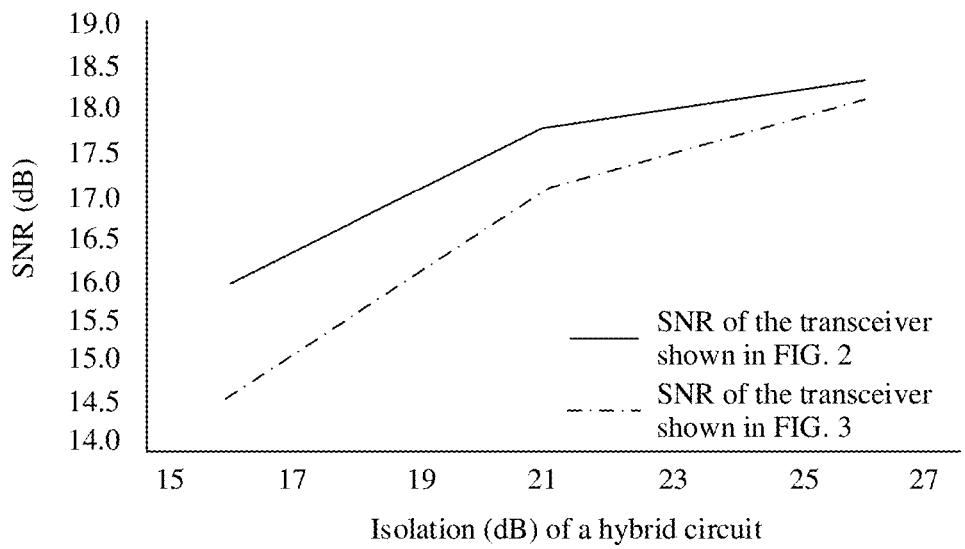
FIG. 6 is a schematic diagram of a curve of isolation of a hybrid circuit and an SNR in case of a transceiver in a PAM 4 modulation scheme in accordance with some embodiments.
Figure 7:
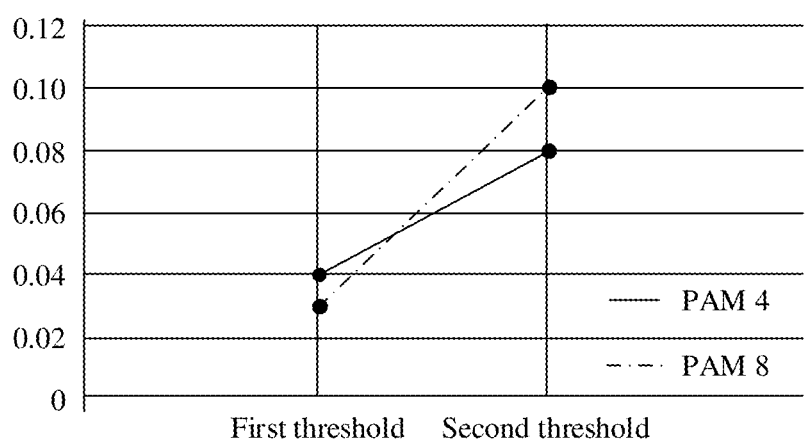
FIG. 7 is a schematic diagram of values of a threshold and a threshold 1 in case of a transceiver in a PAM 4 modulation scheme and a PAM 8 modulation scheme in accordance with some embodiments.

Based on the transceiver provided in the embodiment corresponding to FIG. 4, a PAM 4 modulation scheme of 25 Gbps is used as an example. SNRs that is achieved by the transceiver in different isolation of the hybrid circuit are shown in FIG. 6. As shown in FIG. 6, a solid line represents an SNR that is achieved by a system in different isolation of the hybrid circuit in the solution in some embodiments, and a dash-dotted line represents an SNR that is achieved by the system in different isolation of the hybrid circuit in a conventional DEC+AEC solution. Apparently, an SNR curve of the solution in some embodiments is located above an SNR curve of the conventional DEC+AEC solution. In other words, in same isolation of the hybrid circuit, an SNR that is achieved in the solution in some embodiments is higher than an SNR of the conventional DEC+AEC solution. Performance of the solution in some embodiments is better than that of the conventional DEC+AEC solution, and lower isolation of the hybrid circuit indicates more obvious improvement of performance. In addition, a value of the threshold 1 are not limited in some embodiments, and a value range is usually (0, 1). Empirical values with a good echo cancellation effect is selected as the threshold and the threshold 1 by using an experiment. As shown in FIG. 7, comparison between values of the threshold and the threshold 1 in different modulation schemes is provided, where a solid line is values of the threshold and the threshold 1 in a PAM 4 modulation scheme, and a dash-dotted line is values of the threshold and the threshold 1 in a PAM 8 modulation scheme. From FIG. 7 the threshold and the threshold 1 have different values in different modulation schemes. Therefore, the values of the threshold and the threshold 1 is preset based on different modulation schemes, to achieve a better echo cancellation effect.

In conclusion, the foregoing descriptions are implementations of embodiments, but are not intended to limit the protection scope. Any variation or replacement within the technical scope disclosed in the embodiments shall fall within the protection scope. Therefore, the protection scope shall be subject to the protection scope of the claims.

What is claimed is:

1. A transceiver, comprising:
an echo cancellation apparatus;
a transmit link;
a receive link; and
a hybrid circuit, wherein:
the hybrid circuit operably connects the transmit link and the receive link to a transmission line, and the echo cancellation apparatus includes:
a first signal converter, configured to generate an echo reference signal based on a digital transmit signal on the transmit link;
a slicer, configured to obtain a first cancellation reference signal whose amplitude is greater than a first threshold from the echo reference signal;
a first subtractor, configured to subtract the first cancellation reference signal from the echo reference signal to obtain a second cancellation reference signal;
a second digital-to-analog converter, configured to perform digital-to-analog conversion on the first cancellation reference signal to generate a first echo cancellation signal;
a second subtractor, configured to subtract the first echo cancellation signal from an analog receive signal received by the receive link; and
a third subtractor, configured to subtract the second cancellation reference signal from a digital receive signal on the receive link.

2. The transceiver according to claim 1, further comprising:
a second signal converter, configured to process the second cancellation reference signal based on noise introduced in response to the second digital-to-analog converter performing digital-to-analog conversion on the first cancellation reference signal to generate the first echo cancellation signal or noise introduced in response to the receive link converting the analog receive signal into the digital receive signal.

3. The transceiver according to claim 1, wherein:
the first signal converter includes a first digital filter, and the transceiver further includes:
a training unit, configured to train a first predetermined digital filter model by using the digital receive signal, to obtain a coefficient of the first digital filter, wherein:
the digital receive signal includes a leaked signal obtained after an analog transmit signal on the transmit link is leaked in the hybrid circuit to the receive link and a reflected signal obtained after the analog transmit signal is reflected on the transmission line to the receive link.

4. The transceiver according to claim 3, wherein:
the training unit is configured to train the first predetermined digital filter model by using the digital receive signal and a least mean square (LMS) algorithm.

5. The transceiver according to claim 2, wherein:
the second signal converter includes a second digital filter;
the slicer is further configured to obtain, from the digital transmit signal, a first training digital signal that includes an amplitude greater than the first threshold;
the second digital-to-analog converter is further configured to convert the first training digital signal into a training analog signal;
an analog-to-digital converter on the receive link is configured to convert the training analog signal into a second training digital signal; and
the transceiver further includes a training unit, wherein the training unit is configured to train a second predetermined digital filter model by using the second training digital signal to obtain a coefficient of the second digital filter.

6. The transceiver according to claim 5, wherein:
the training unit is configured to train the second predetermined digital filter model by using the second training digital signal and an LMS algorithm.

7. The transceiver according to claim 1, wherein:
the transmission line includes a single twisted pair.

8. The transceiver according to claim 1, wherein:
a 1-bit digital-to-analog converter is configured to be used as the second digital-to-analog converter, and an amplitude of the first echo cancellation signal is a voltage amplitude threshold of the second digital-to-analog converter.

9. An echo cancellation method, comprising:
generating, by an echo cancellation apparatus, an echo reference signal based on a digital transmit signal on a transmit link, wherein:
the echo cancellation apparatus is included with a transceiver that further includes a hybrid circuit that operably connects the transmit link and a receive link to a transmission line;
obtaining a first cancellation reference signal whose amplitude is greater than a first threshold from the echo reference signal;
subtracting the first cancellation reference signal from the echo reference signal to obtain a second cancellation reference signal;
performing digital-to-analog conversion on the first cancellation reference signal to generate a first echo cancellation signal;
subtracting the first echo cancellation signal from an analog receive signal received by the receive link; and
subtracting the second cancellation reference signal from a digital receive signal on the receive link.

10. The echo cancellation method according to claim 9, further comprising:
before the subtracting the second cancellation reference signal from the digital receive signal on the receive link, processing the second cancellation reference signal based on noise introduced in response to digital-to-analog conversion being performed on the first cancellation reference signal to generate the first echo cancellation signal or noise introduced in response to the receive link converting the analog receive signal into the digital receive signal.

11. The echo cancellation method according to claim 9, further comprising:
training a first predetermined digital filter model by using the digital receive signal, to obtain a coefficient of a first digital filter, comprising:
generating, by the first digital filter, the echo reference signal based on the digital transmit signal on the transmit link; and
obtaining a leaked signal included with the digital receive signal in response to an analog transmit signal on the transmit link being leaked in the hybrid circuit to the receive link and a reflected signal obtained after the analog transmit signal is reflected on the transmission line to the receive link.

12. The echo cancellation method according to claim 11, wherein:
the training the first predetermined digital filter model by using the digital receive signal comprises:
training the first predetermined digital filter model by using the digital receive signal and a least mean square LMS algorithm.

13. The echo cancellation method according to claim 10, further comprising:
obtaining, from the digital transmit signal, a first training digital signal that includes an amplitude greater than the first threshold;
converting the first training digital signal into a training analog signal;
converting the training analog signal into a second training digital signal; and
training a second predetermined digital filter model by using the second training digital signal, to obtain a coefficient of a second digital filter, wherein the second digital filter is configured to process the second cancellation reference signal.

14. The echo cancellation method according to claim 13, wherein:
the training the second predetermined digital filter model by using the second training digital signal comprises:
training the second predetermined digital filter model by using the second training digital signal and an LMS algorithm.

15. A method, comprising:
generating, by a first signal converter, an echo reference signal based on a digital transmit signal on a transmit link;
obtaining, by a slicer, a first cancellation reference signal whose amplitude is greater than a first threshold from the echo reference signal;
subtracting, by a first subtractor, the first cancellation reference signal from the echo reference signal to obtain a second cancellation reference signal;
performing, by a digital-to-analog converter, digital-to-analog conversion on the first cancellation reference signal to generate a first echo cancellation signal;
subtracting, by a second subtractor, the first echo cancellation signal from an analog receive signal received by a receive link; and
subtracting, by a third subtractor, the second cancellation reference signal from a digital receive signal on the receive link.

16. The method according to claim 15, further comprising:
before the subtracting the second cancellation reference signal from the digital receive signal on the receive link, processing, by a digital domain processor, the second cancellation reference signal based on noise introduced in response to digital-to-analog conversion performed on the first cancellation reference signal to generate the first echo cancellation signal or noise introduced in response to the receive link converting the analog receive signal into the digital receive signal.

17. The method according to claim 15, further comprising:
training, by a training unit, a first predetermined digital filter model by using the digital receive signal to obtain a coefficient of a first digital filter, comprising:
generating, by the first digital filter, the echo reference signal based on the digital transmit signal on the transmit link; and
obtaining a leaked signal included with the digital receive signal in response to an analog transmit signal on the transmit link being leaked in a hybrid circuit to the receive link and a reflected signal obtained after the analog transmit signal is reflected on a transmission line to the receive link.

18. The method according to claim 17, wherein;
the training, by the training unit, the first predetermined digital filter model by using the digital receive signal comprises:
training the first predetermined digital filter model by using the digital receive signal and a least mean square LMS algorithm.

19. The echo cancellation method according to claim 10, further comprising:
obtaining, from the digital transmit signal, a first training digital signal that includes an amplitude greater than the first threshold;
converting the first training digital signal into a training analog signal;
converting the training analog signal into a second training digital signal; and
training a second predetermined digital filter model by using the second training digital signal, to obtain a coefficient of a second digital filter, wherein the second digital filter is configured to process the second cancellation reference signal.

20. The echo cancellation method according to claim 13, wherein:
the training the second predetermined digital filter model by using the second training digital signal comprises:
training the second predetermined digital filter model by using the second training digital signal and an LMS algorithm.

* * * * *